2 Sheets--Sheet 1.
RICHARD M. HOE.
Improvement in Feeding Paper to Printing Presses.
No. 4,429. Reissued June 20, 1871.
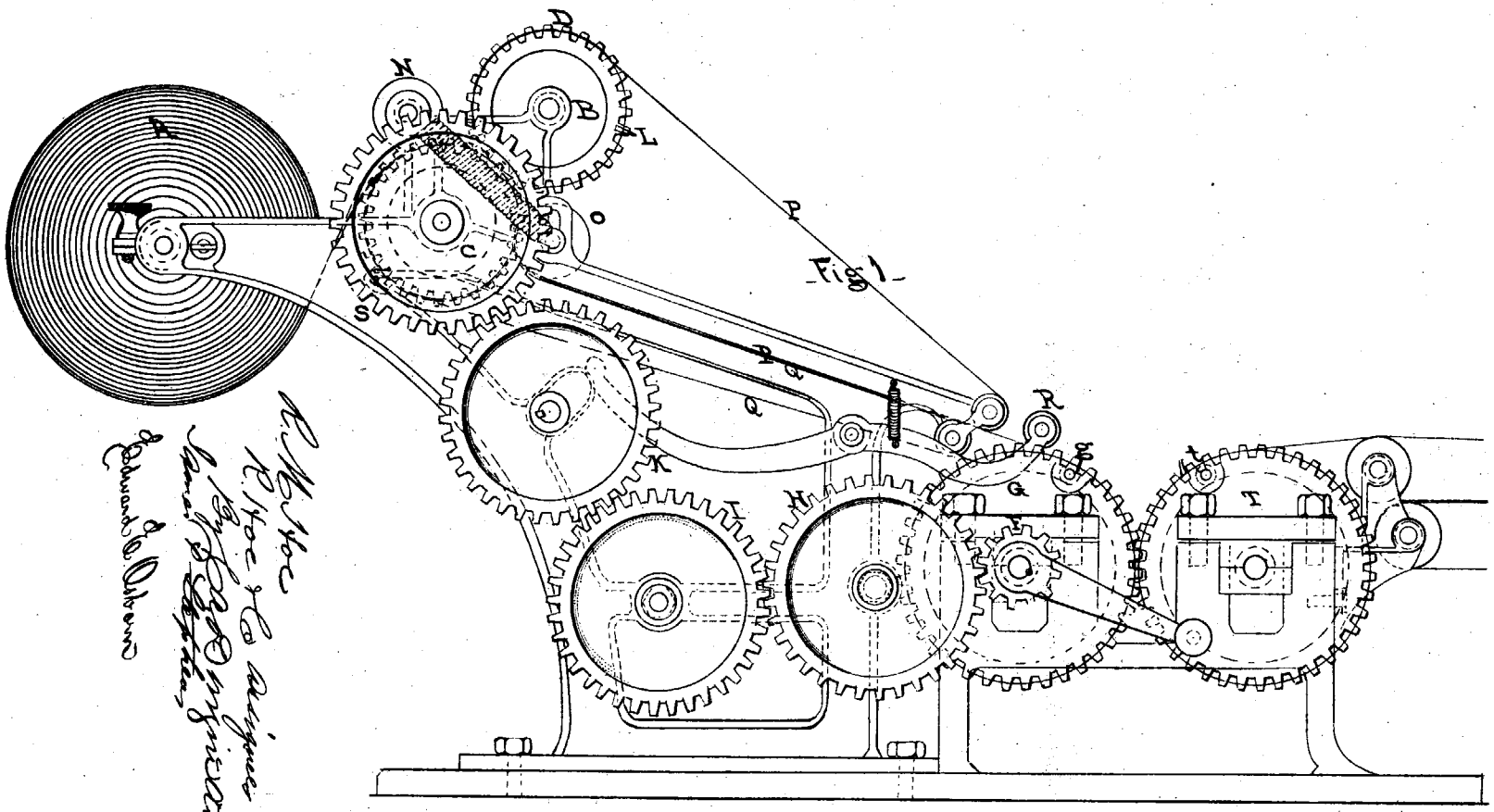
AM. PHOTO-LITHOGRAPHIC CO. N.Y. (OSBORNE'S PROCESS.)

2 Sheets--Sheet 2.
RICHARD M. HOE.
Improvement in Feeding Paper to Printing Presses.
No. 4.429. Reissued June 20, 1871.
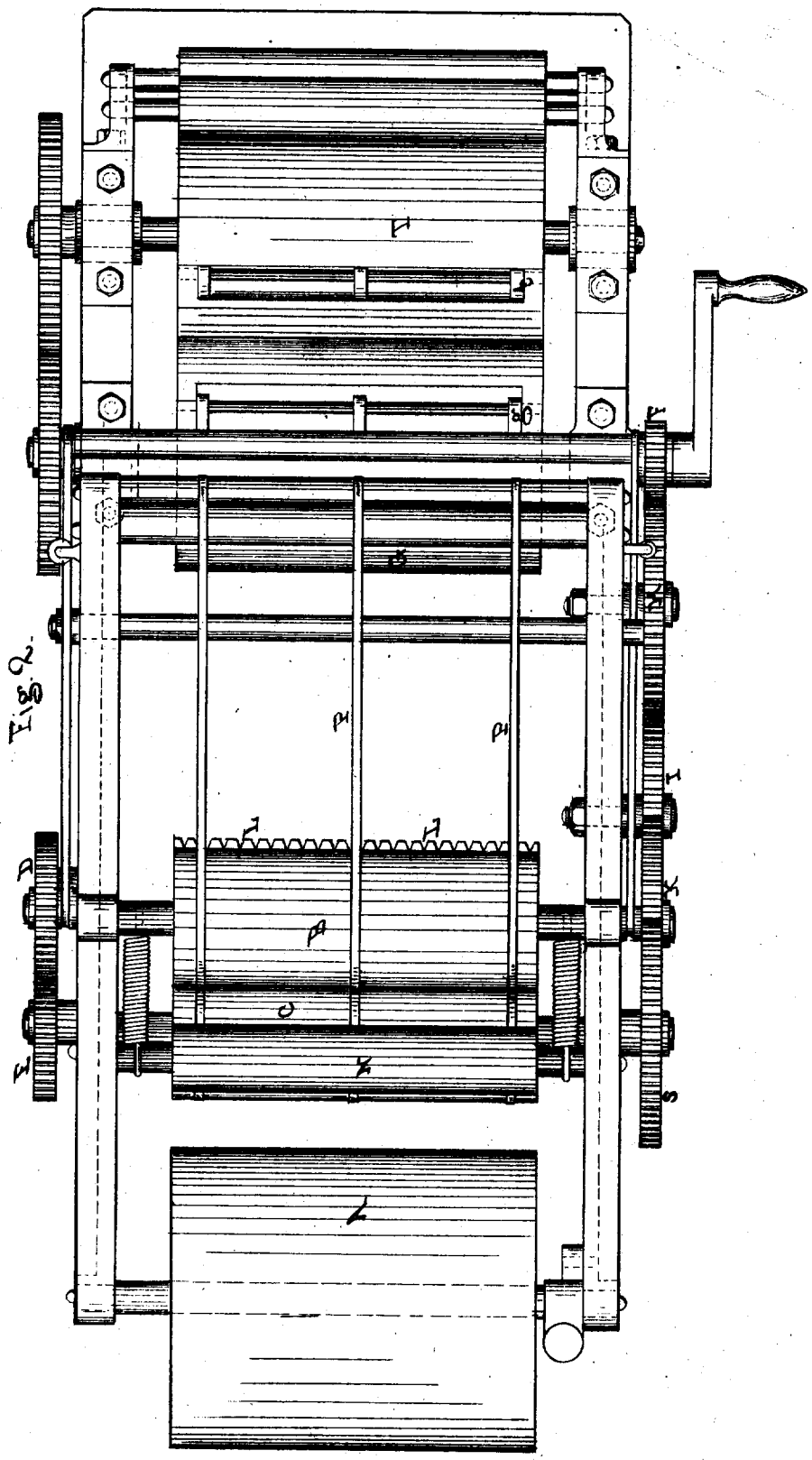
AM. PHOTO-LITHOGRAPHIC CO. N.Y. (OSBORNE'S PROCESS.)

UNITED STATES PATENT OFFICE.

RICHARD M. HOE, OF NEW YORK, N. Y., FOR HIMSELF, AND ASSIGNOR TO ROBERT HOE, PETER S. HOE, STEPHEN D. TUCKER, WILLIAM L. COLBY, AND ROBERT HOE, JR.

IMPROVEMENT IN FEEDING PAPER TO PRINTING-PRESSES.

Specification forming part of Letters Patent No. 25,199, dated August 23, 1859; reissue No. 4,429, dated June 20, 1871.

*To all whom it may concern:*

Be it known that RICHARD M. HOE, of the city, county, and State of New York, did invent certain new and useful Improvements in the Mode of Feeding Paper to Printing-Presses, of which the following is a specification:

The nature of this invention consists in feed- a printing-machine from a continuous roll of paper and cutting or separating the paper into sheets; and also in constructing the cutting apparatus so that the sheets will be partially cut or separated from each other by leaving them connected at certain points in the line of cut, the paper being held at the time of cutting by means of pressure-rollers, and the sheets being conveyed to the printing mechanism by the means hereafter described.

Figure 1 of the drawing is a side elevation, and Fig. 2 is a plan of a printing-machine with my invention arranged and combined therewith.

*General Description.*

The roll of paper from which the sheets to be printed are cut is represented at A. The sheets are cut and partially separated by passing between the cutting-cylinders B C, whose circumference is just equal to the length of sheet to be cut from the roll. They are geared together by the wheels D E, and are driven by the pinion F upon the shaft of the impression-cylinder G, through the medium of the wheels H I K S. The wheel S, keyed on the shaft of the cutting-cylinder C, and the pinion F upon the impression-cylinder shaft, are in proportion of three to one, because the impression-cylinder G makes three revolutions to every sheet printed, while the cutting-cylinders make but one. When the sheet is seized by the nippers *g* of the first impression-cylinder it is carried around to receive the impression upon one side from the type-cylinder beneath the impression-cylinder G; and upon the next revolution it is seized by the nippers *t* of the second impression-cylinder T, and brought in contact with the second type-cylinder beneath the cylinder T, to receive the impression upon the other side; the cylinder G, therefore, does not come in proper position to take the next sheet until its third revolution, as the first sheet is not taken off until the second revolution; and it has another revolution to make before the nippers *g* are in position to take the second sheet. The cutter L, fixed in the periphery of the cylinder B, is arranged parallel to the axis of the cylinder, and projects a little beyond the surface; its edge is formed into teeth with sharp edges, like a saw-blade, but at one or more places the teeth are cut away or removed, so that during the revolution of the cylinders the sheet will be cut or separated from the roll of paper except at the points where the teeth have been removed. The surface of the cylinder C is cut away at the point where the cutter L comes in contact with it, so as to form a groove, into which the cutter enters as the cylinders revolve. After being acted upon by the cutter L the paper is conveyed by the tapes P Q to the impression-cylinder G, where the sheet is seized and torn from the roll by the drop-roller R, operated by a cam on the shaft of the wheel K. The conducting-tapes P Q pass around the cylinders B C at the points where the teeth of the cutter are removed; and as they approach the cylinder G their inner surfaces are slightly separated, to permit the sheet, when seized by the drop-roller, to be easily torn from the roll and drawn forward from the tapes. The two pressure-rollers N O, arranged around the circumference of the cylinder C, hold the paper smoothly upon the cylinder, and properly distended to be acted upon by the cutter.

This mechanism is particularly applicable to paper that requires to be passed but once through the printing-machine—as, for instance, to be printed on one side only; or to perfecting-machines, that print both sides at one application.

It is not intended to limit this invention to the special construction herein specified, as equivalents may be substituted for either or all of the elements without changing the principle of the invention.

*Claims.*

What is claimed as the invention of RICHARD M. HOE is—

1. The combination of the feeding mechanism, cutting apparatus, and the printing-machine, or their equivalents in the said combination, for feeding the paper from a roll to a printing-machine, and cutting or partially cutting it into sheets as it passes along to be printed, substantially as set forth and specified.

2. Constructing the cutter so as to leave the several sheets united in certain places, substantially as described, in combination with the conducting-tapes, or the equivalents thereof, as described, so that the conducting-tapes may pass around the cylinder, substantially as described and set forth.

3. The combination of the cutting-cylinder and the grooved cylinder, or the equivalents thereof, of the two pressure-rollers, or their equivalents, for keeping the sheet distended, substantially as described and specified.

ROBT. HOE.
PETER S. HOE.
STEPHEN D. TUCKER.
WM. L. COLBY.
ROBERT HOE, JR.

Witnesses to above signatures:
C. A. DURGIN,
EDWARD E. OSBORN.

RICHD. M. HOE.

Witnesses to signature of R. M. HOE:
WILLIAM CONQUEST,
WILLIAM BOND.